(12) United States Patent
O'Brien et al.

(10) Patent No.: US 8,052,186 B2
(45) Date of Patent: Nov. 8, 2011

(54) HIGH RISE HOSE PACK SYSTEM

(76) Inventors: Timothy P. O'Brien, Rocklin, CA (US); Gabriel Z. Deurloo, Roseville, CA (US); Jon Van Dort, Citrus Heights, CA (US)

( * ) Notice: Subject to any disclaimer, the term of this patent is extended or adjusted under 35 U.S.C. 154(b) by 965 days.

(21) Appl. No.: 12/016,707

(22) Filed: Jan. 18, 2008

(65) Prior Publication Data

US 2008/0174133 A1 Jul. 24, 2008

Related U.S. Application Data

(60) Provisional application No. 60/881,404, filed on Jan. 19, 2007.

(51) Int. Cl.
*B65D 71/00* (2006.01)
(52) U.S. Cl. .................. 294/141; 294/165
(58) Field of Classification Search ............. 294/165, 294/77, 140, 141, 151, 152; 5/625, 627, 5/628

See application file for complete search history.

(56) References Cited

U.S. PATENT DOCUMENTS

| | | | | |
|---|---|---|---|---|
| 2,489,828 A * | 11/1949 | Springer | ............. | 5/628 |
| 4,425,000 A * | 1/1984 | Keck, Jr. | ............. | 294/165 |
| 4,442,557 A | 4/1984 | Clemens | | |
| 4,478,452 A | 10/1984 | Clemens | | |
| 4,566,445 A * | 1/1986 | Jelsma et al. | ............. | 5/628 |
| 4,858,797 A | 8/1989 | Rabska | | |
| 5,050,254 A * | 9/1991 | Murphy | ............. | 5/625 |
| 5,088,137 A * | 2/1992 | Rose | ............. | 5/625 |
| 5,251,945 A * | 10/1993 | Stoops | ............. | 294/152 |
| 5,579,966 A | 12/1996 | Krumweide et al. | | |
| 5,720,303 A * | 2/1998 | Richardson | ............. | 128/870 |
| 5,918,785 A * | 7/1999 | Irose | ............. | 224/259 |
| 5,978,989 A * | 11/1999 | Chavez | ............. | 5/627 |
| 6,193,293 B1 * | 2/2001 | Ybanez | ............. | 294/152 |
| 6,267,319 B1 | 7/2001 | Hoffmann et al. | | |
| 6,477,728 B1 * | 11/2002 | Faz | ............. | 5/625 |
| 6,581,998 B1 | 6/2003 | Clemens | | |
| 6,659,389 B1 | 12/2003 | Hoffmann et al. | | |
| 6,953,214 B2 * | 10/2005 | Paz | ............. | 294/157 |
| 2007/0136950 A1 * | 6/2007 | Zuercher | ............. | 5/627 |

OTHER PUBLICATIONS

True North Gear, High-Rise Hose Strap, <Retrieved from http://www.truenorthgear.com/product_detail.php?path=0_4&p_id=54>, Jan. 18, 2008.

(Continued)

*Primary Examiner* — Paul T Chin
(74) *Attorney, Agent, or Firm* — Michael S. Neustel

(57) ABSTRACT

A high rise hose pack system for efficiently transporting a length of fire hose. The high rise hose pack system generally includes a main member having an elongated structure, a plurality of first support members attached to a first side of the main member, a plurality of second support members attached to a second side of the main member opposite of the first support members, a first strap attached to the first side of the main member and a second strap attached to the second side of the main member, wherein the first strap and the second strap are connectable to one another to secure a fire hose folded upon the main member. The first support members and the second support members are preferably comprised of a rigid structure to adequately support the sides of the folded fire hose. A roller is rotatably attached to at least one of the second straps to allow the folded fire hose to bend freely without the second strap frictionally engaging the upper surface of the folded fire hose.

20 Claims, 11 Drawing Sheets

OTHER PUBLICATIONS

True North Gear, Magnum Hose Strap, <Retrieved from http://www.truenorthgear.com/product_detail.php?path=0_4&p_id=56>, Jan. 18, 2008.

Anclotefire & Safety, High Rise Pack, <Retrieved from https://www.anclotefire.com/proddetail.php?prod=423RD>, Jan. 18, 2008.

All Hands Fire Equipment, All Hands High Rise Hose Pack (Soft Bottom), <Retrieved from http://www.allhandsfire.com/page/AHF/PROD/highrisepacksandstraps/AH-HRP-S>, Jan. 18, 2008.

All Hands Fire Equipment, All Hands High Rise Hose Pack (Hard Bottom), <Retrieved from http://www.allhandsfire.com/page/AHF/PROD/highrisepacksandstraps/AH-HRP-H>, Jan. 18, 2008.

All Hands Fire Equipment, High Rise Hose Pack, <Retrieved from http://www.allhandsfire.conn/page/AHF/PROD/highrisepacksandstraps/343-HP-200>, Jan. 18, 2008.

All Hands Fire Equipment, Clemens Manhattan High Rise Hose Pack,<Retrieved from http://www.allhandsfire.com/page/AHF/PROD/highrisepacksandstraps/MHP-12A>, Jan. 18, 2008.

All Hands Fire Equipment, Clemens Gramax High Rise Hose Pack (4' Long),<Retrieved from http://www.allhandsfire.com/page/AHF/PROD/highrisepacksandstraps/GHP-11A>, Jan. 18, 2008.

All Hands Fire Equipment, Clemens Clem Portable High Rise Hose Pack,<Retrieved from http://www.allhandsfire.com/page/AHF/PROD/highrisepacksandstraps/HRP-10A>, Jan. 18, 2008.

All Hands Fire Equipment, High Rise Carry Pack,<Retrieved from http://www.allhandsfire.com/page/AHF/PROD/highrisepacksandstraps/343-HP-300>, Jan. 18, 2008.

FIREFIGHTING EQUIPMENT.COM, High Rise Hose Pack, <Retrieved from http://www.firefighting-equipment.com/firefighting_equipment_bags_highrise_hosepack150.html>, Jan. 18, 2008.

Fireend Fire Services Products, Fire Hose Straps and Bags, <Retrieved from http://fire-end.com/Hose_strap.htm>, Jan. 18, 2008.

* cited by examiner

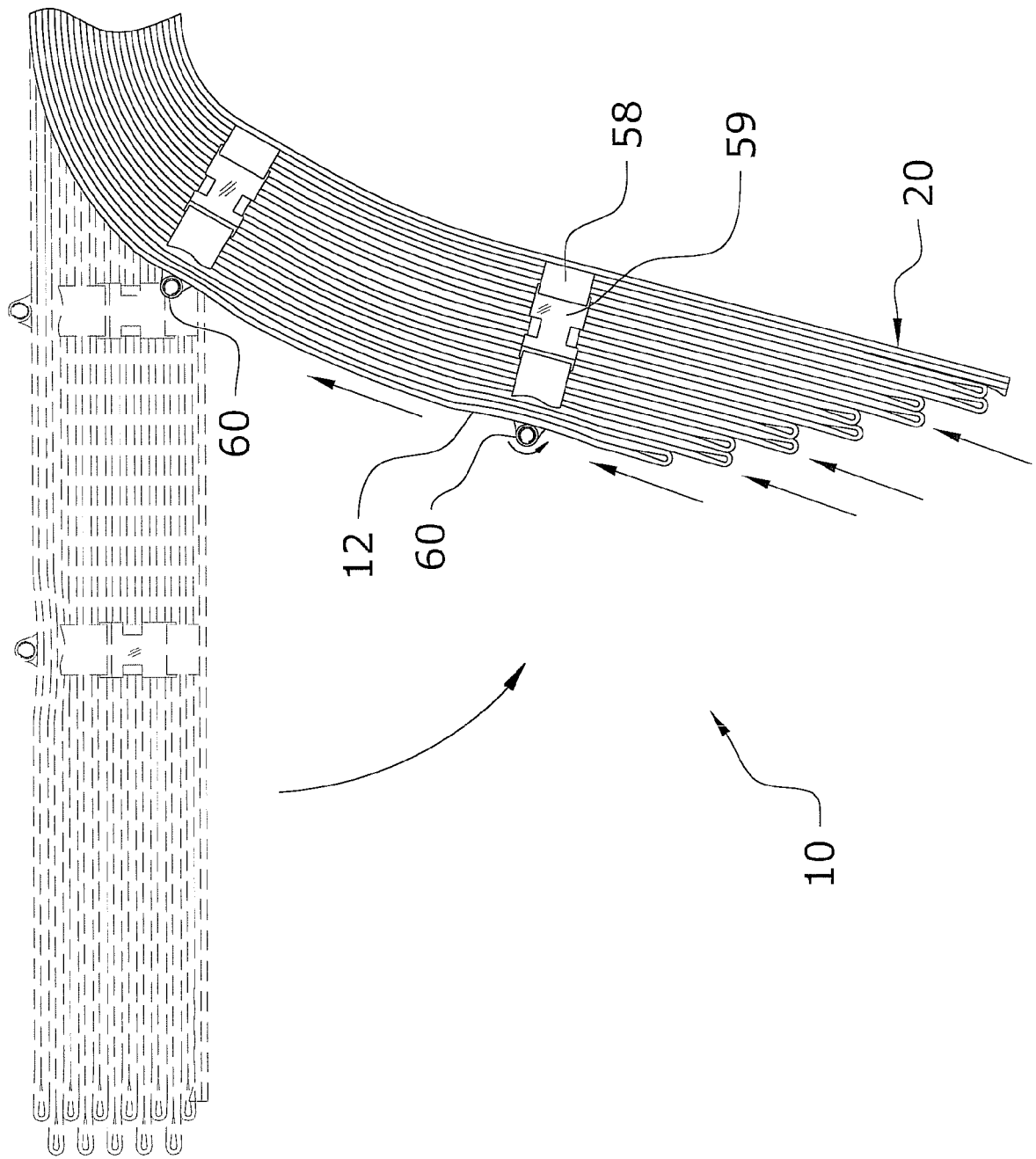

HIGH RISE HOSE PACK SYSTEM

CROSS REFERENCE TO RELATED APPLICATIONS

I hereby claim benefit under Title 35, United States Code, Section 119(e) of U.S. provisional patent application Ser. No. 60/881,404 filed Jan. 19, 2007. The 60/881,404 application is currently pending. The 60/881,404 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to high rise hose packs for fire hoses and more specifically it relates to a high rise hose pack system for efficiently transporting a length of fire hose.

2. Description of the Related Art

Any discussion of the related art throughout the specification should in no way be considered as an admission that such related art is widely known or forms part of common general knowledge in the field.

When entering a high rise building, or a location which is a significant distance from the pumping apparatus, a fire fighter must carry various types of tools and equipment with them into the building. For example, when entering a high rise building with a standpipe water delivery system, a firefighter must carry a fire hose having a length of approximately 200 feet which is cumbersome and heavy to carry.

High rise packs (a.k.a. "high rise bundles") have been used by firefighters for years to transport the long fire hose along with various tools and equipment. Conventional high rise packs are comprised of an elongated carrying case that opens to receive the length of fire hose folded upon itself in multiple layers forming an elongated rectangular structure. The fire fighter may either use shoulder straps attached to the high rise pack to carry the fire hose or directly position the high rise pack on their shoulder.

One of the main problems with conventional high rise packs is that they are cumbersome for firefighters to carry when fully loaded with the fire hose. For example, when carrying with the shoulder straps the load is at the waist of the firefighter and can inhibit their movement within a building. In addition, when carrying the high rise pack on their shoulder, the folded fire hose tends to maintain a relatively rigid and elongated structure making it difficult to balance on the shoulder of the fire fighter. Finally, conventional high rise packs have soft and flexible side support resulting in the folded fire hose becoming misaligned and potentially creating a situation where it is difficult to remove the fire hose from the high rise pack.

Because of the inherent problems with the related art, there is a need for a new and improved high rise hose pack system for efficiently transporting a length of fire hose.

BRIEF SUMMARY OF THE INVENTION

The general purpose of the present invention is to provide a high rise hose pack system that has many of the advantages of the high rise packs mentioned heretofore. The invention generally relates to a high rise packs which includes a main member having an elongated structure, a plurality of first support members attached to a first side of the main member, a plurality of second support members attached to a second side of the main member opposite of the first support members, a first strap attached to the first side of the main member and a second strap attached to the second side of the main member, wherein the first strap and the second strap are connectable to one another to secure a fire hose folded upon the main member. The first support members and the second support members are preferably comprised of a rigid structure to adequately support the sides of the folded fire hose. A roller is rotatably attached to at least one of the second straps to allow the folded fire hose to bend freely without the second strap frictionally engaging the upper surface of the folded fire hose.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide a high rise hose pack system for efficiently transporting a length of fire hose.

Another object is to provide a high rise hose pack system that decreases the effort required to carry a fire hose.

An additional object is to provide a high rise hose pack system that allows at least a portion of the fire hose to easily bend to conform to the shape of the firefighter's shoulder.

A further object is to provide a high rise hose pack system that ensures that the fire hose remains properly aligned when in the storage position.

Another object is to provide a high rise hose pack system that receives and transports a fire hose and various other required equipment.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 7c is a magnified side view of the present invention in the curved state illustrating the rotation of the rollers upon the upper surface of the fire hose during the curving of the structure.

DETAILED DESCRIPTION OF THE INVENTION

A. Overview

Figure 1:
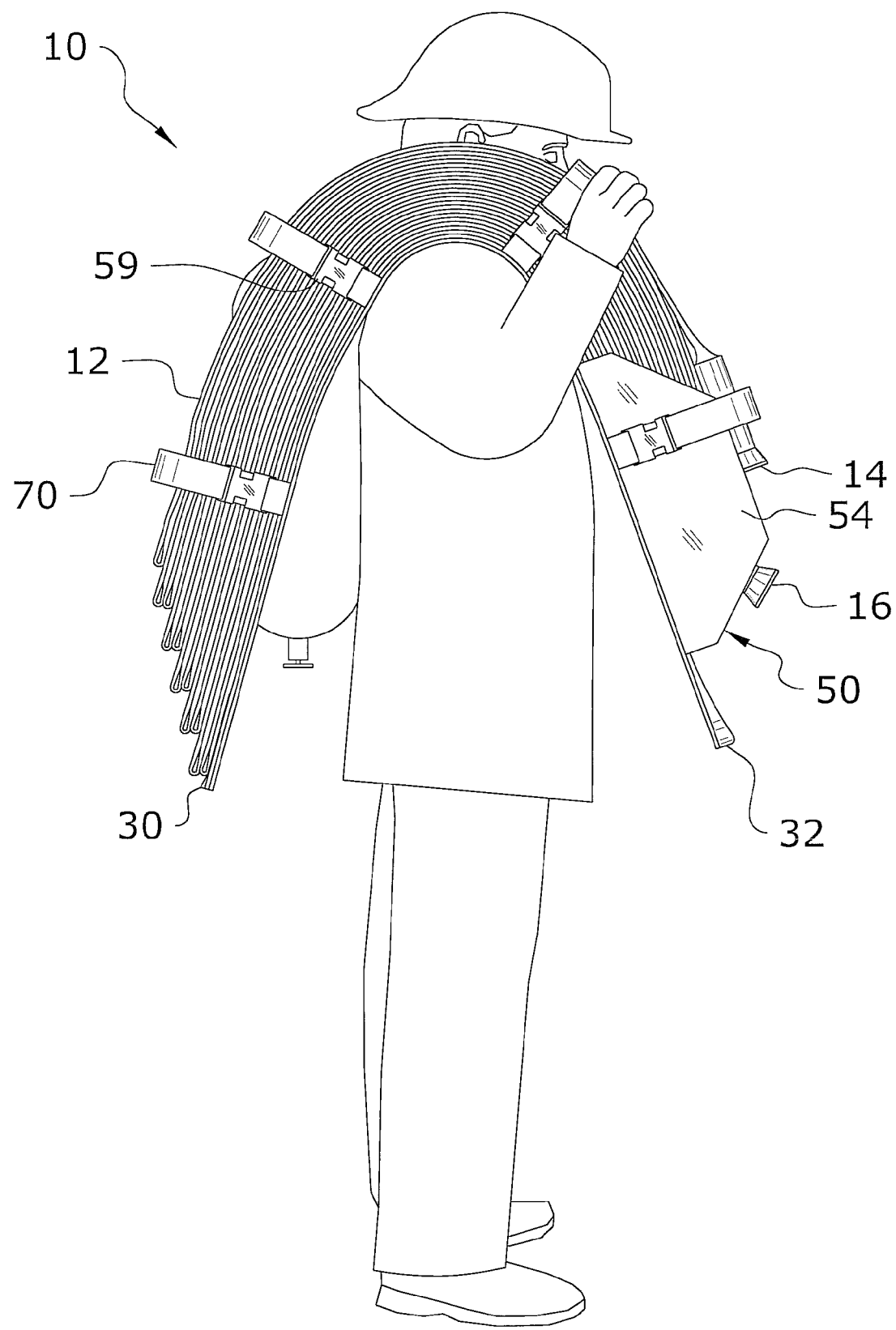
FIG. 1 is a side view of the present invention supported upon the shoulder of a firefighter.
Figure 2:
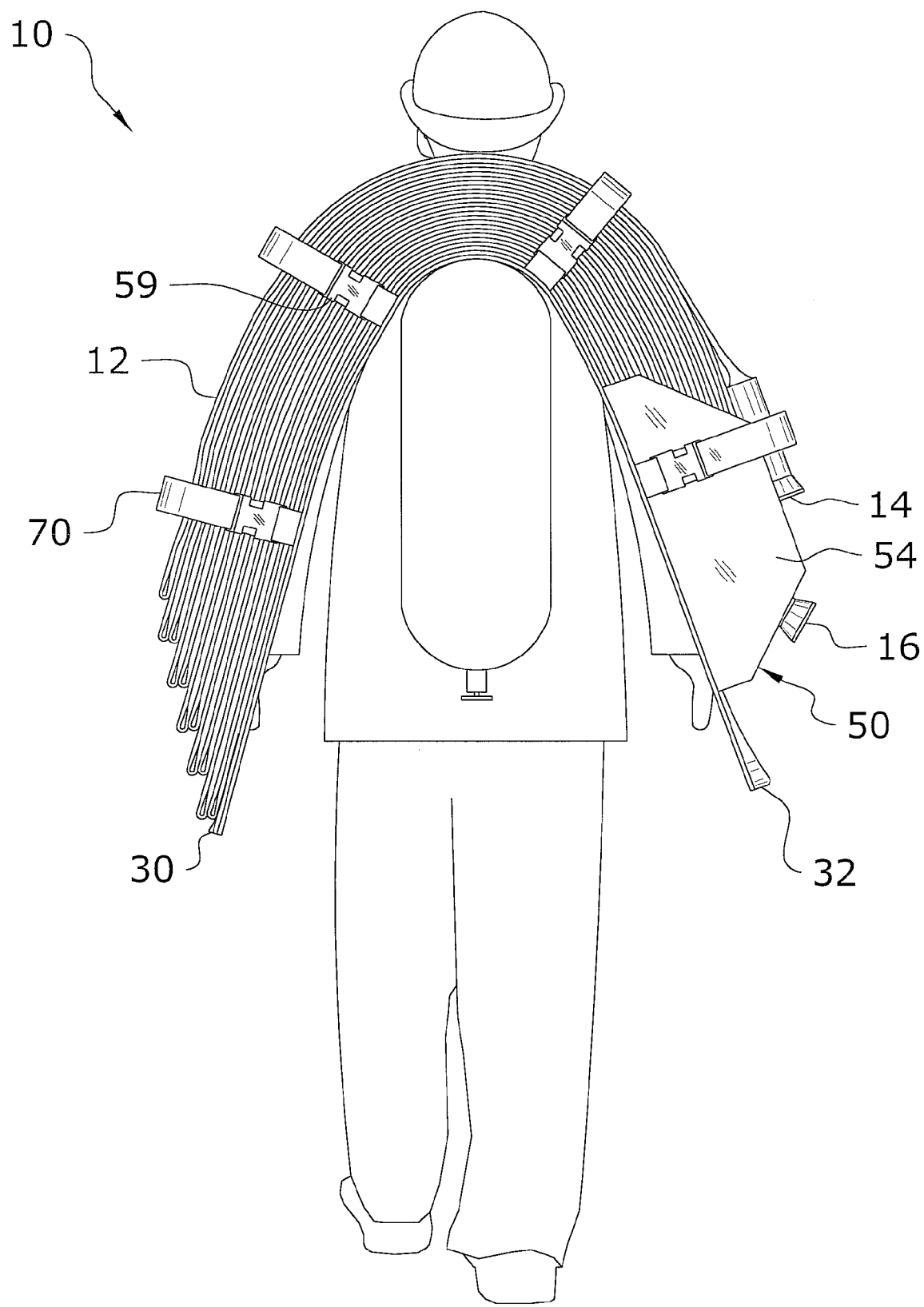
FIG. 2 is a rear view of the present invention supported upon an air tank attached to a firefighter.

Turning now descriptively to the drawings, in which similar reference characters denote similar elements throughout the several views, FIGS. 1 through 9 illustrate a high rise hose pack system 10, which comprises a main member 20 having an elongated structure, a plurality of first support members 40 attached to a first side of the main member 20, a plurality of second support members 42 attached to a second side of the main member 20 opposite of the first support members 40, a first strap 58 attached to the first side of the main member 20 and a second strap 56 attached to the second side of the main member 20, wherein the first strap 58 and the second strap 56 are connectable to one another to secure a fire hose 12 folded upon the main member 20. The first support members 40 and the second support members 42 are preferably comprised of a rigid structure to adequately support the sides of the folded fire hose 12. A roller is rotatably attached to at least one of the second straps 56 to allow the folded fire hose 12 to bend freely without the second strap 56 frictionally engaging the upper surface of the folded fire hose 12.

B. Main Member

Figure 3:
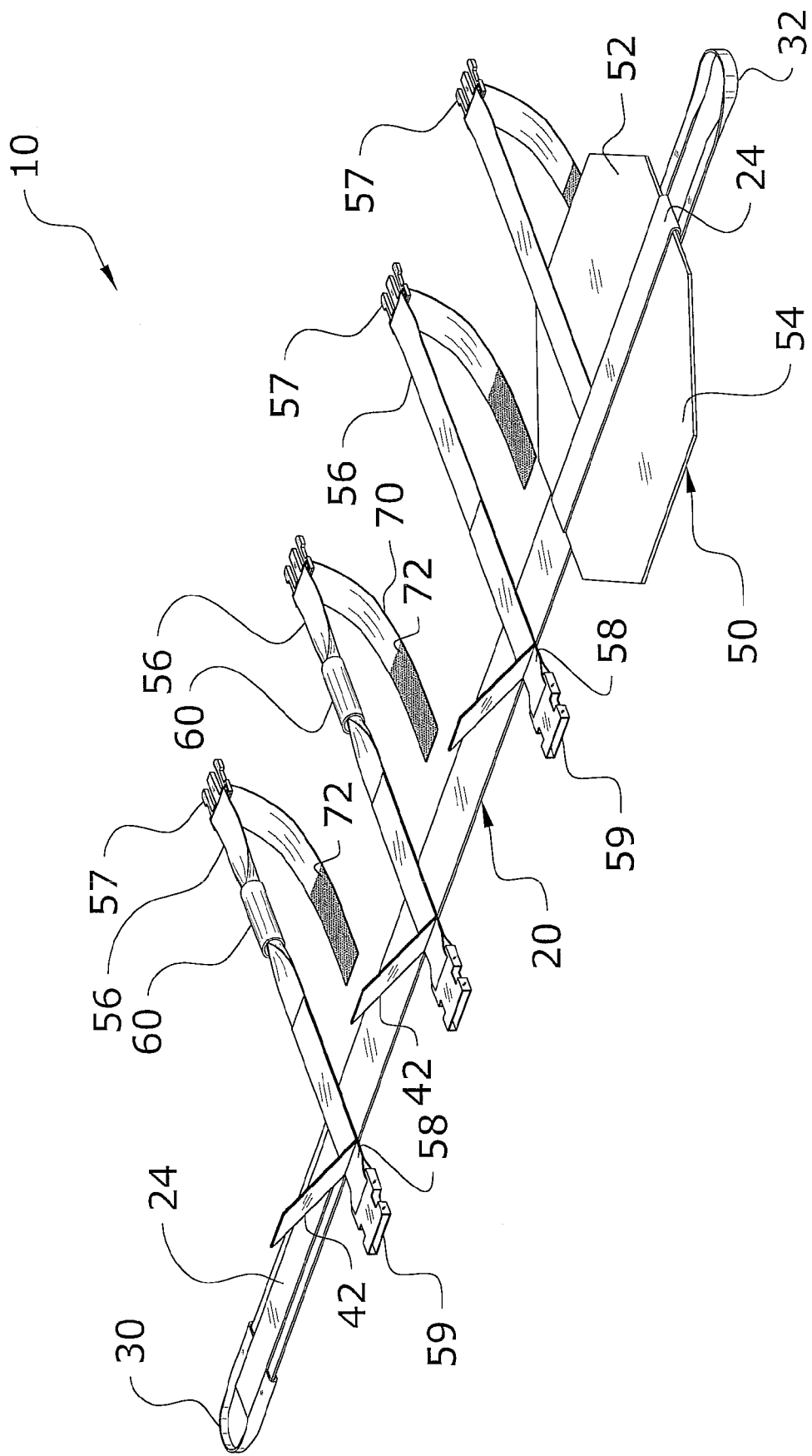
FIG. 3 is an upper perspective view of the present invention in an open and expanded state.
Figure 4:
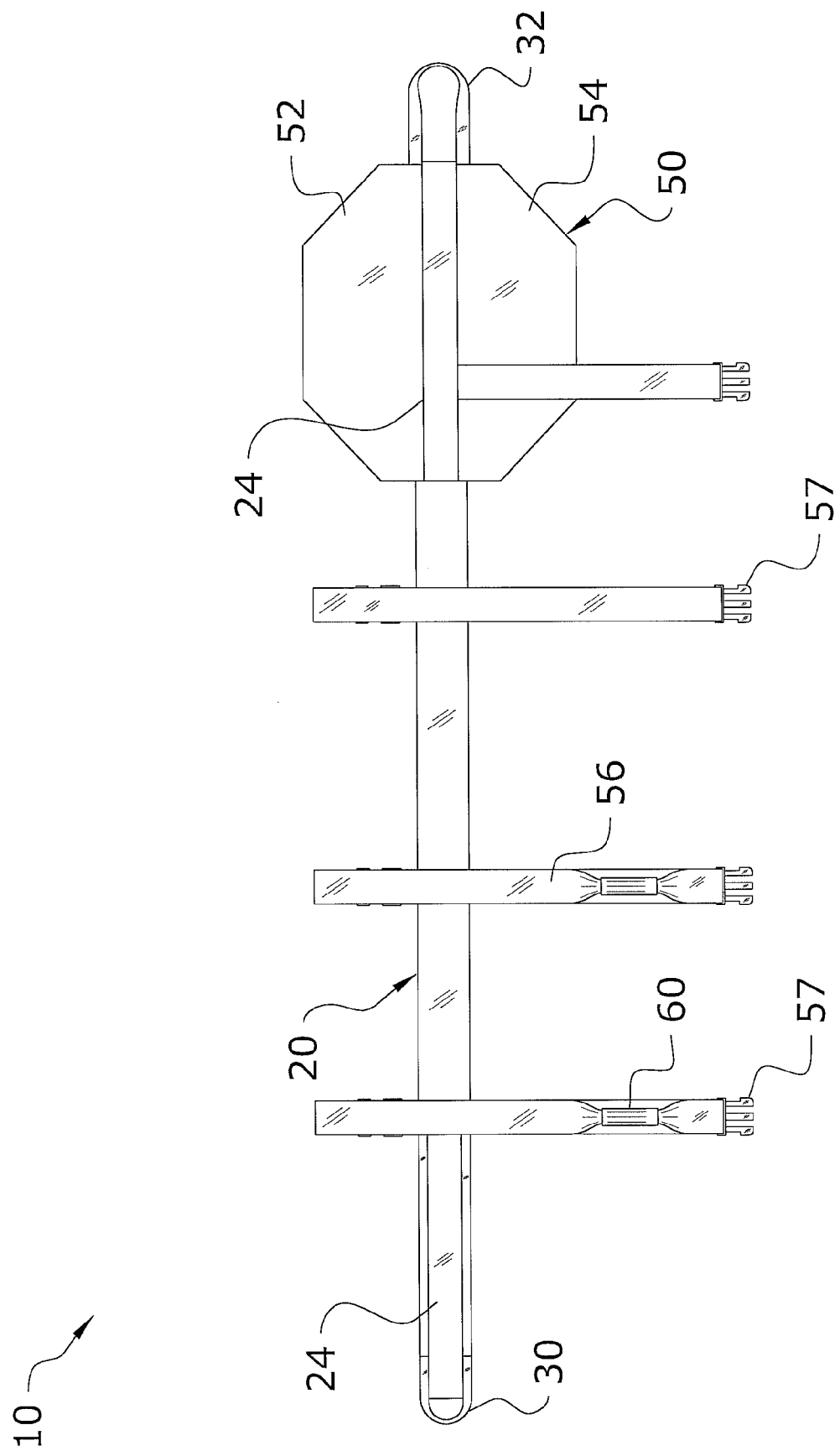
FIG. 4 is a top view of the present invention.
Figure 5:
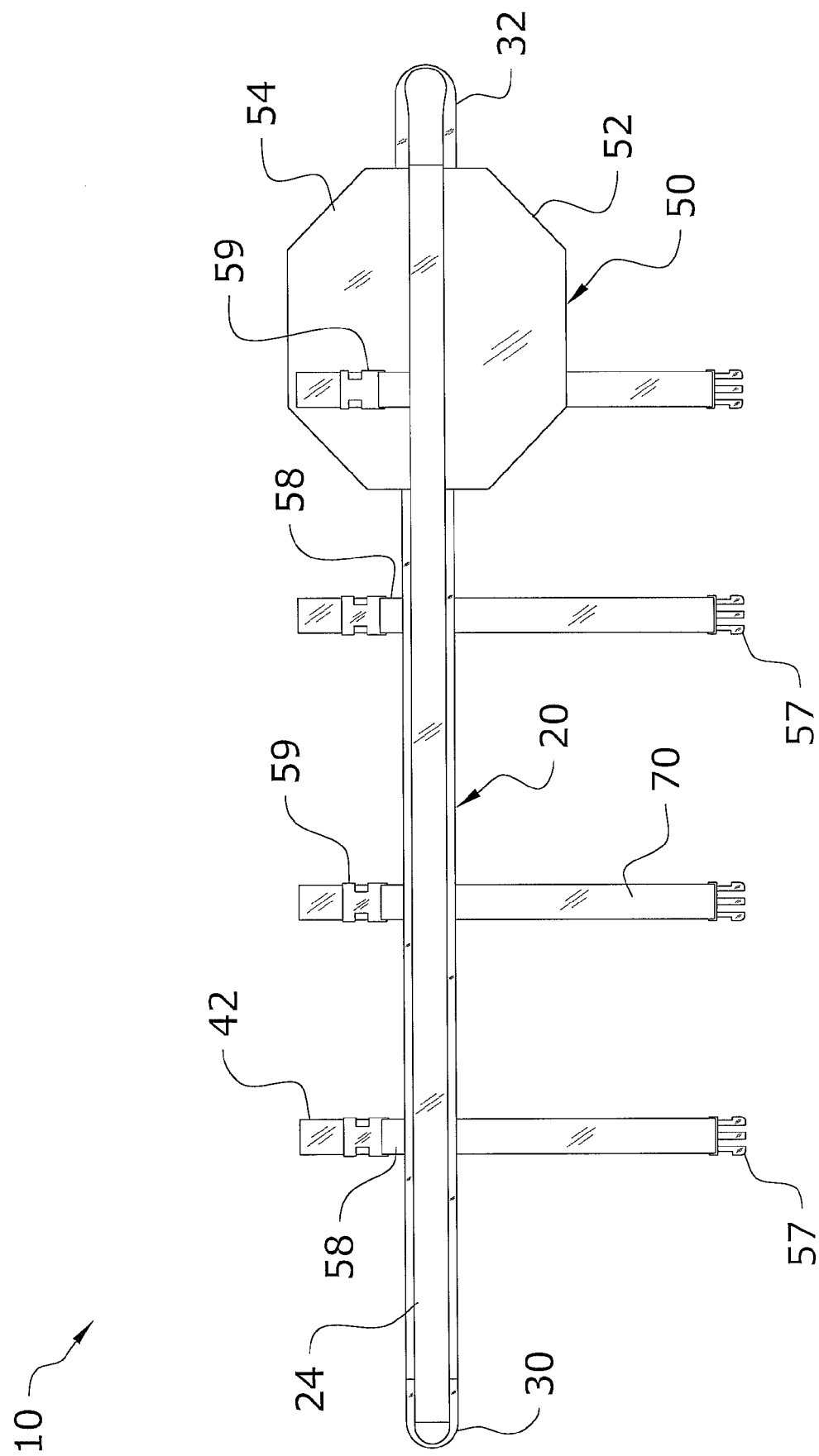
FIG. 5 is a bottom view of the present invention.
Figure 7A:
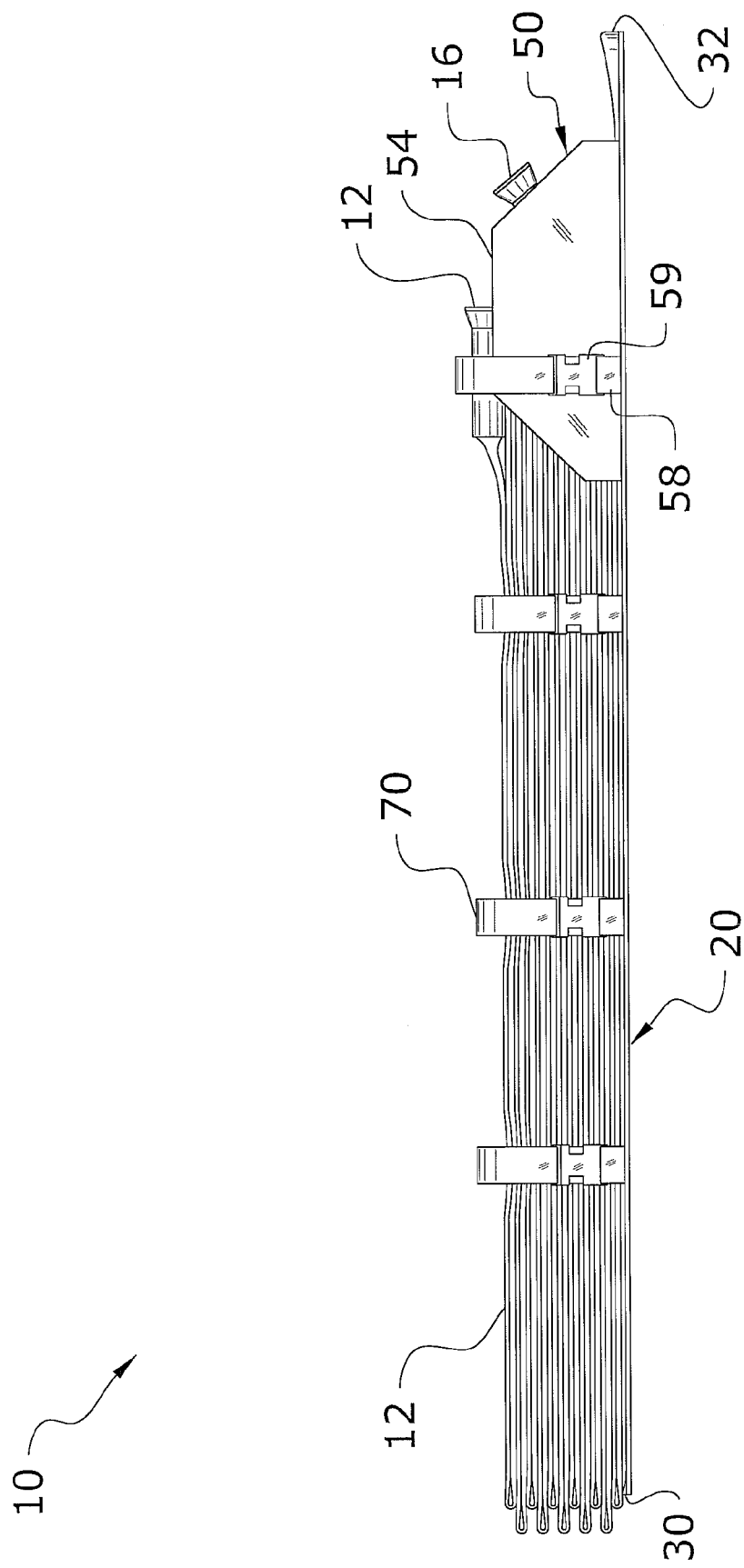
FIG. 7a is a side view of the present invention securing a folded fire hose.
Figure 8:
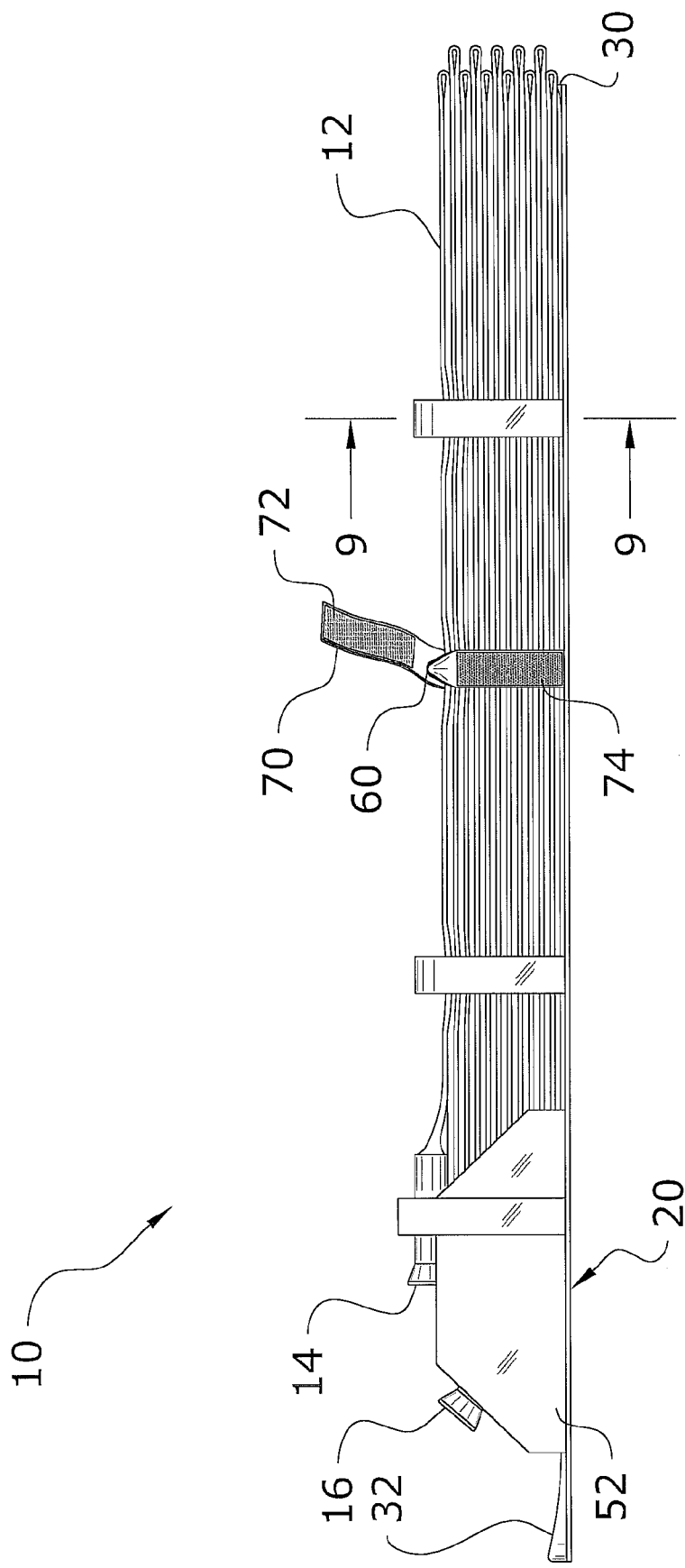
FIG. 8 is a side view of the present invention securing a folded fire hose with an extended strap removed from the sidewall.

FIGS. 3 through 5 best illustrate the main member 20 comprised of an elongated structure. The length of the main member 20 is preferably at least six feet in length and is capable of receiving a fire hose 12 having a length of approximately two-hundred feet. The main member 20 is preferably approximately seven feet in length and has a width sufficient to receive a fire hose 12 having a diameter of 1.5 inches and/or 1.75 inches or 2.5 inches. The main member 20 is comprised of a length that extends along at least a substantial portion of a folded fire hose 12 as best illustrated in FIGS. 7a and 8 of the drawings. The main member 20 is comprised a flat and straight structure as further illustrated in FIGS. 3 through 5 of the drawings.

Figure 9:
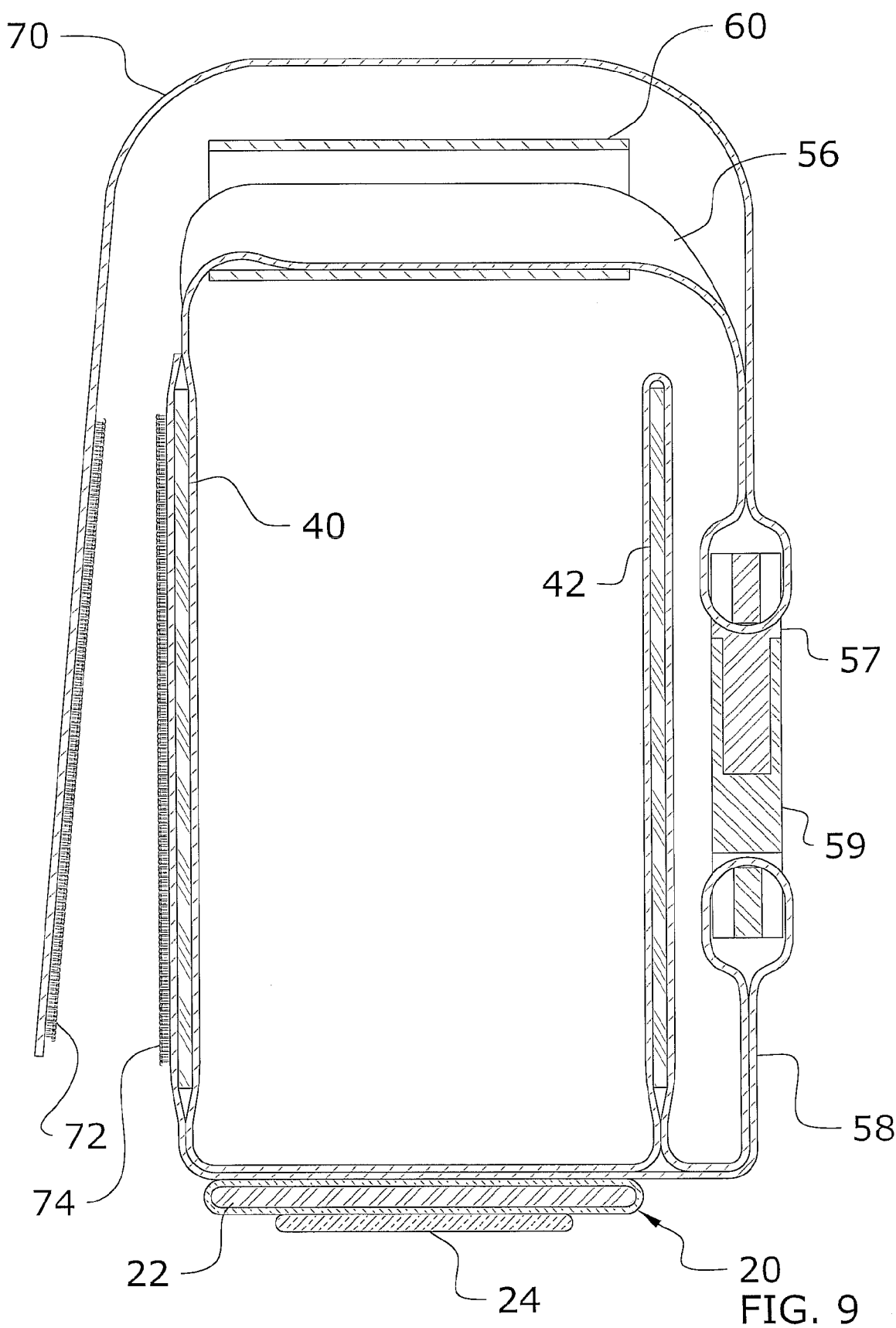
FIG. 9 is a cross sectional view taken along line 9-9 of FIG. 8 with the fire hose removed.

The main member 20 is comprised of a flexible and resilient structure along the longitudinal axis. The main member 20 preferably is not flexible from side to side. The main member 20 preferably includes a reinforcing member 22 to stiffen the main member 20 as best illustrated in FIG. 9 of the drawings. The reinforcing member 22 preferably extends along at least a significant portion of the main member 20. The reinforcing member 22 is preferably comprised of a flexible plastic stiffener material. The reinforcing member 22 is preferably covered by a durable covering such as but not limited to nylon (e.g. CORDURA®).

A reinforcing strap 24 is preferably attached to the bottom of the main member 20 as illustrated in FIGS. 5 and 9 of the drawings. The reinforcing strap 24 is comprised of a material that provides reduced friction to aid in sliding the main member 20 with respect to a fire apparatus compartment.

A first handle 30 is preferably attached to a first end of the main member 20 as illustrated in FIGS. 3 through 5 of the drawings. A second handle 32 is preferably attached to a second end of the main member 20 opposite of the first handle 30. The first handle 30 and the second handle 32 are preferably comprised of a flexible strap having a loop structure. The fire fighter is able to grasp the present invention by engaging the first handle 30 or the second handle 32.

C. Support Members

FIGS. 3 through 5 illustrate a plurality of first support members 40 attached to a first side of the main member 20 and a plurality of second support members 42 attached to a second side of the main member 20 opposite of the first support members 40. The first support members 40 and the second support members 42 are comprised of an elongated rectangular structure. The length of the support members 40, 42 is preferably no greater than the height of the folded fire hose 12 to allow for proper securing of the folded fire hose 12.

Figure 6:
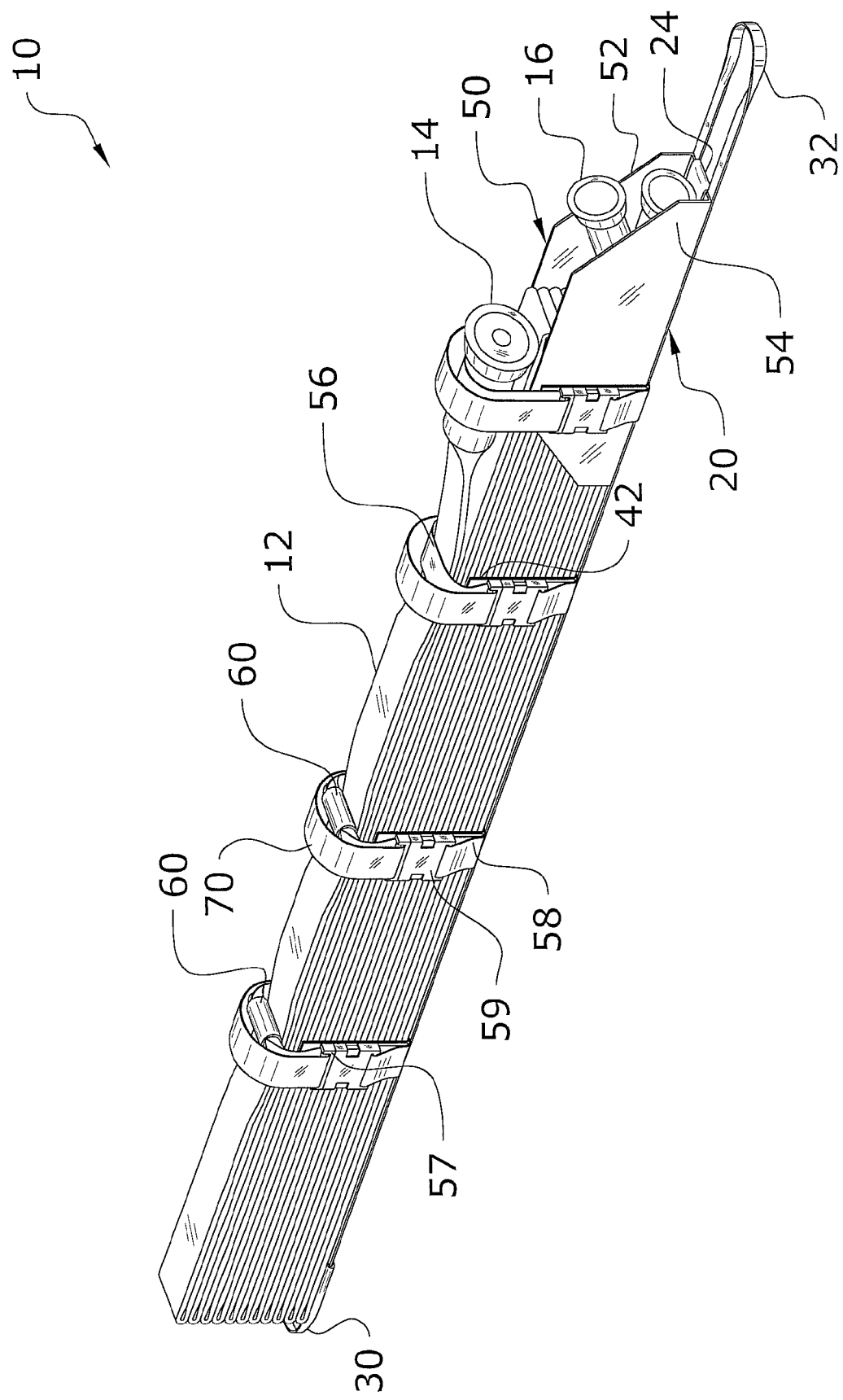
FIG. 6 is an upper perspective view of the present invention securing a folded fire hose.

The first support members 40 and the second support members 42 are comprised of a rigid structure to adequately support the sides of the folded fire hose 12. The first support members 40 and the second support members 42 are each preferably comprised of a rigid member surrounded by a covering. The rigid member is preferably comprised of a lightweight metal such as aluminum. When the support members 40, 42 are extended upwardly, they form a relatively rigid U-shaped structure for snugly receiving the folded fire hose 12 as illustrated in FIG. 6 of the drawings.

D. Securing Straps

A plurality of first straps 58 are attached to the first side of the main member 20 and a plurality of second straps 56 are attached to the second side of the main member 20 as shown in FIGS. 3 through 5 of the drawings. The plurality of second straps 56 are preferably attached to distal portions of the plurality of second support members 42 as best illustrated in FIG. 9 of the drawings.

The first straps 58 and the second straps 56 are connectable to one another to secure a folded fire hose 12 positioned upon the main member 20. Each of the first straps 58 preferably includes a first connector 59 and each of the second straps 56 preferably includes a second connector 57 wherein the connectors 57, 59 are removably connectable to one another. The connectors 57, 59 are preferably comprised of quick release buckles that may be manipulated by a fire fighter wearing gloves.

The second connectors 57 are preferably adjustably positioned upon the corresponding second straps 56 to allow for adjustment by the user. The portion of the second strap 56 extending past the second connector 57 is comprised of an extended strap 70. A first fastener 72 is preferably attached to the extended strap 70 and a second fastener 74 is preferably attached to the corresponding first support member 40. When the connectors 57, 59 are attached to one another to secure the folded fire hose 12, the extended portion is folded over the upper portion thereof and attached adjustably by the fasteners 72, 74 as shown in FIG. 9 of the drawings. The fasteners are preferably comprised of a hook and loop fastener material.

E. Rollers

At least one roller is preferably attached to one of the second straps 56 to allow for longitudinal movement of the upper surface of the folded fire hose 12 within the present invention during transportation. It is preferable to have a plurality of rollers 60 attached to a rear group of the plurality of second straps 56 to allow a rear portion of the folded fire hose 12 to bend freely without the second strap 56 frictionally engaging the upper surface of the folded fire hose 12 as best illustrated in FIG. 7c of the drawings.

Figure 7B:
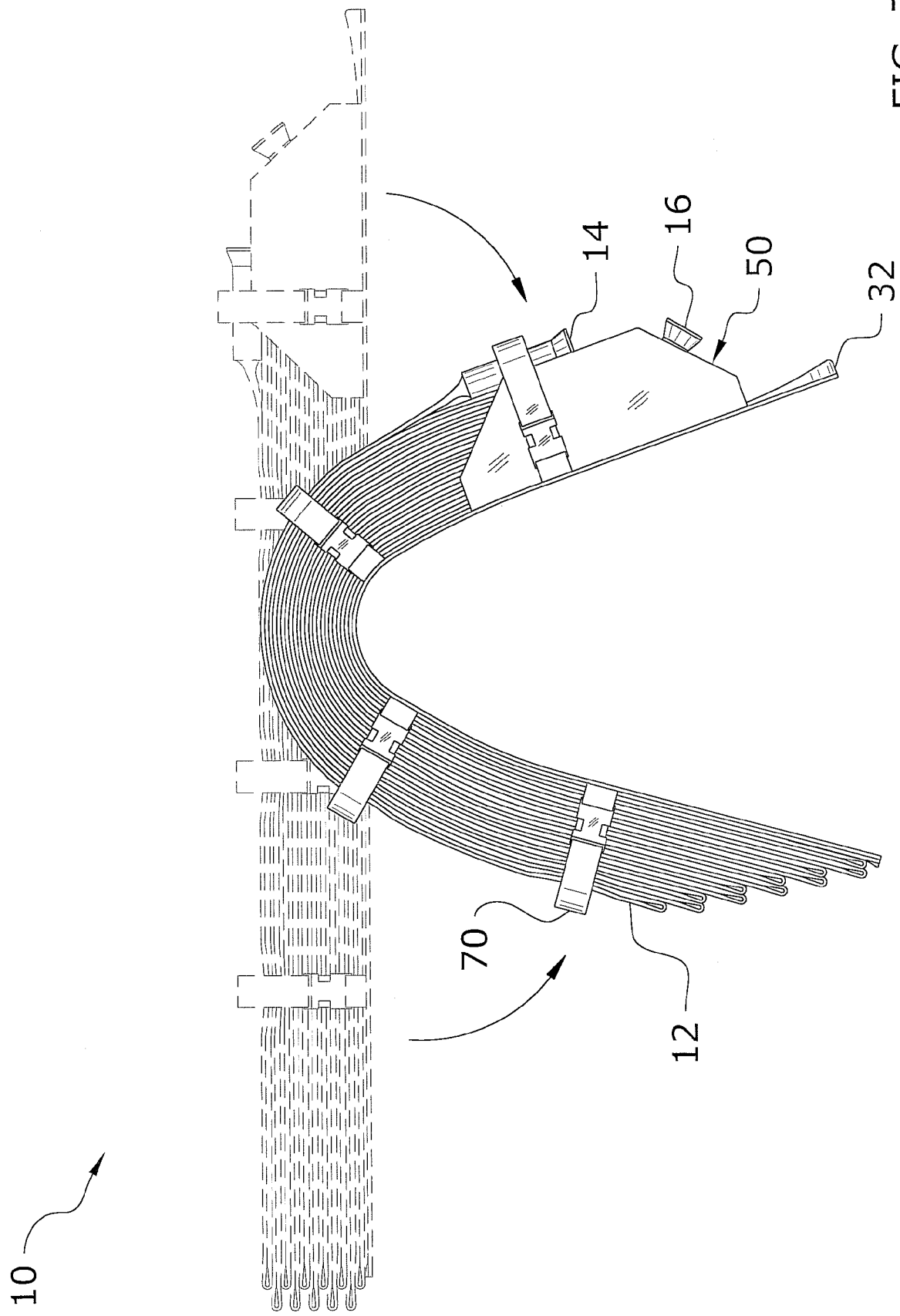
FIG. 7b is a side view of the present invention in a curved state with the folded fire hose.

The plurality of rollers 60 are preferably comprised of a tube rotatably surrounding a portion of the plurality of second straps 56 as illustrated in FIGS. 3 and 9 of the drawings. The rollers 60 may be comprised of any material that has reduced resistance such as but not limited to plastic. The rollers 60 are preferably comprised of a substantially rigid material. In use, the second straps 56 with the rollers 60 attached to them are looser with respect to the folded fire hose 12 to allow the fire hose 12 to conform to a curved shape without resistance by the second straps 56 as shown in FIGS. 7b and 7c of the drawings.

It is preferable that a front group of the plurality of second straps 56 do not include a roller to allow for frictional engagement of the folded fire hose 12. The front group of second straps 56 are preferably secured tight upon the folded fire hose 12 to prevent the front portion of the folded fire hose 12 from moving during transportation of the fire hose 12.

F. Appliance Housing

As shown in FIGS. 3 through 5 of the drawings, an appliance housing 50 is preferably attached to a front portion of the main member 20. The appliance housing 50 is preferably comprised of a first sidewall 54 attached to the first side of the main member 20 and a second sidewall 52 attached to the second side of the main member 20. The first sidewall 54 and the second sidewall 52 are preferably comprised of a broad wall structure to retain the fire hose 12 along with the nozzle 14 and fluid connector 16 attached to the fire hose 12. The sidewalls 52, 54 preferably are comprised of a rigid core surrounded by a durable fabric material (e.g. nylon fabric).

G. Operation of Preferred Embodiment

In use, the fire hose 12 is folded into a plurality of layers. The folded fire hose 12 is then positioned upon the upper surface of the main member 20 as shown in FIGS. 6 and 7a of the drawings. The user then secures the first straps 58 to the second straps 56 to secure the folded fire hose 12 within. The rear group of second straps 56 having the rollers 60 are preferably secured in a relatively loose manner and the front group of second straps 56 without the rollers 60 are preferably secured in a relatively snug manner to frictionally engage the folded fire hose 12. The user also may secure the extended straps 70 to the first support members 40.

To transport the folded fire hose 12, the fire fighter lifts the present invention and centrally positions the bottom surface of the main member 20 upon their shoulder as shown in FIG. 1 of the drawings. As best illustrated in FIG. 7c of the drawings, the rear portion of the upper layers of the folded fire hose 12 are allowed to move with respect to one another thereby allowing the folded fire hose 12 to easily conform to a curved shape about the shoulder of the fire fighter.

Once the fire fighter has transported the fire hose to a desired location, the fire fighter then lowers the present invention. The fire fighter then removes the second straps from the first straps by releasing the connectors 57, 59 and then is able to remove the fire hose for use.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

We claim:

1. A high rise hose pack system, comprising:
a main member having an elongated structure;
a plurality of first support members attached to a first side of said main member;
a plurality of second support members attached to a second side of said main member opposite of said plurality of first support members;
a plurality of first straps attached to said first side of said main member;
a plurality of second straps attached to said second side of said main member, wherein said first straps and said second straps are connectable to one another to secure a folded fire hose positioned upon said main member; and
at least one roller attached to at least one of said plurality of second straps to allow said folded fire hose to bend freely without said second strap frictionally engaging said upper surface of said folded fire hose.

2. The high rise hose pack system of claim 1, wherein said plurality of first support members and said plurality of second support members are comprised of a rigid structure to adequately support the sides of said folded fire hose.

3. The high rise hose pack system of claim 2, wherein said plurality of first support members and said plurality of second support members are each comprised of a rigid member surrounded by a covering.

4. The high rise hose pack system of claim 1, wherein said plurality of first support members and said plurality of second support members are comprised of an elongated rectangular structure.

5. The high rise hose pack system of claim 1, wherein said plurality of second straps are attached to distal portions of said plurality of first support members.

6. The high rise hose pack system of claim 1, wherein said at least one roller is comprised of a plurality of rollers attached to a rear group of said plurality of second straps to allow a rear portion of said folded fire hose to bend freely without said second strap frictionally engaging said upper surface of said folded fire hose.

7. The high rise hose pack system of claim 6, wherein said plurality of rollers are comprised of a tube rotatably surrounding a portion of said plurality of second straps.

8. The high rise hose pack system of claim 1, including a first handle attached to a first end of said main member and a second handle attached to a second end of said main member.

9. The high rise hose pack system of claim 1, wherein said main member includes a reinforcing member to stiffen said main member.

10. A high rise hose pack system, comprising:
a folded fire hose;
a main member having an elongated structure;
a plurality of first support members attached to a first side of said main member;
a plurality of second support members attached to a second side of said main member opposite of said plurality of first support members;
a plurality of first straps attached to said first side of said main member;
a plurality of second straps attached to said second side of said main member, wherein said first straps and said second straps are connectable to one another to secure said folded fire hose positioned upon said main member; and
an appliance housing attached to a front portion of said main member, wherein said appliance housing is comprised of a first sidewall attached to said first side of said main member and a second sidewall attached to said second side of said main member.

11. The high rise hose pack system of claim 10, wherein said plurality of first support members and said plurality of second support members are comprised of a rigid structure to adequately support the sides of said folded fire hose.

12. The high rise hose pack system of claim 11, wherein said plurality of first support members and said plurality of second support members are each comprised of a rigid member surrounded by a covering.

13. The high rise hose pack system of claim 10, wherein said plurality of first support members and said plurality of second support members are comprised of an elongated rectangular structure.

14. The high rise hose pack system of claim 10, wherein said plurality of second straps are attached to distal portions of said plurality of first support members.

15. The high rise hose pack system of claim 10, including at least one roller attached to at least one of said plurality of second straps to allow said folded fire hose to bend freely without said second strap frictionally engaging said upper surface of said folded fire hose.

16. The high rise hose pack system of claim 10, including a plurality of rollers attached to a rear group of said plurality of second straps to allow a rear portion of said folded fire hose to bend freely without said second strap frictionally engaging said upper surface of said folded fire hose.

17. The high rise hose pack system of claim 16, wherein said plurality of rollers are comprised of a tube rotatably surrounding a portion of said plurality of second straps.

18. The high rise hose pack system of claim 10, including a first handle attached to a first end of said main member and a second handle attached to a second end of said main member.

19. The high rise hose pack system of claim 10, wherein said main member includes a reinforcing member to stiffen said main member.

20. A high rise hose pack system, comprising:
a folded fired hose;
a main member having an elongated structure;
a plurality of first support members attached to a first side of said main member;
a plurality of second support members attached to a second side of said main member opposite of said plurality of first support members;
wherein said plurality of first support members and said plurality of second support members are comprised of a rigid structure to adequately support the sides of said folded fire hose;
a plurality of first straps attached to said first side of said main member;
a plurality of second straps attached to said second side of said main member, wherein said first straps and said second straps are connectable to one another to secure said folded fire hose positioned upon said main member; and
at least one roller attached to at least one of said plurality of second straps to allow said folded fire hose to bend freely without said second strap frictionally engaging said upper surface of said folded fire hose.

* * * * *